US011271358B2

(12) United States Patent
Reeves-Hall

(10) Patent No.: US 11,271,358 B2
(45) Date of Patent: Mar. 8, 2022

(54) CONTROL OF HEATING IN ACTIVE DOPED OPTICAL FIBER

(71) Applicant: Massachusetts Institute of Technology, Cambridge, MA (US)

(72) Inventor: Peter C Reeves-Hall, Northbridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 97 days.

(21) Appl. No.: 16/904,935

(22) Filed: Jun. 18, 2020

(65) Prior Publication Data

US 2020/0321745 A1    Oct. 8, 2020

Related U.S. Application Data

(63) Continuation of application No. 15/874,748, filed on Jan. 18, 2018, now Pat. No. 10,727,641.

(60) Provisional application No. 62/448,017, filed on Jan. 19, 2017.

(51) Int. Cl.
*H01S 3/067* (2006.01)
*H01S 3/10* (2006.01)
*H01S 3/13* (2006.01)

(52) U.S. Cl.
CPC ...... *H01S 3/10013* (2019.08); *H01S 3/06754* (2013.01); *H01S 3/13017* (2019.08)

(58) Field of Classification Search
CPC .... H01S 3/13017; H01S 3/13; H01S 3/06745; H01S 3/10013; H01S 3/094007; G02B 6/2555
See application file for complete search history.

(56) References Cited

U.S. PATENT DOCUMENTS

| | | | | |
|---|---|---|---|---|
| 3,652,248 A | * | 3/1972 | Loxley | ................. C03B 37/025 65/108 |
| 5,314,517 A | * | 5/1994 | Koening | ........... C03B 37/01242 427/163.1 |
| 8,881,552 B2 | * | 11/2014 | Otosaka | ........... C03B 37/01242 65/382 |
| 9,221,712 B2 | * | 12/2015 | Bernard | .............. C03B 37/0253 |

* cited by examiner

*Primary Examiner* — Tuan N Nguyen
(74) *Attorney, Agent, or Firm* — Theresa A. Lober

(57) ABSTRACT

In a draw tower for producing a length of optical fiber, a preform feed accepts a preform into the draw tower and a furnace downstream of the preform feed heats the preform. Fiber shaping hardware downstream of the thermal furnace is controlled by fiber shaping control electronics to produce along the fiber at least one low-absorption fiber section having a first cross-sectional geometry of the inner cladding layer corresponding to a first level of absorption of input pump light from the inner cladding layer to the core and at least one high-absorption fiber section having a second cross-sectional geometry of the inner cladding layer corresponding to a second level of absorption of input pump light from the inner cladding layer to the core that is greater than the first level of absorption. A tractor downstream of shaping hardware pulls the preform through the furnace and shaping hardware.

20 Claims, 11 Drawing Sheets

CONTROL OF HEATING IN ACTIVE DOPED OPTICAL FIBER

CROSS-REFERENCE TO RELATED APPLICATIONS

This application is a continuation of application Ser. No. 15/874,748, filed Jan. 18, 2018, which claims the benefit of U.S. Provisional Patent Application No. 62/448,017, filed Jan. 19, 2017, the entirety of both of which are hereby incorporated by reference.

STATEMENT REGARDING FEDERALLY SPONSORED RESEARCH

This invention was made with Government support under Contract No. FA8721-05-C-0002, awarded by the U.S. Air Force. The Government has certain rights in the invention.

BACKGROUND

This invention relates generally to optical fiber, and more particularly relates to active, doped optical fiber.

The development of doped, actively-pumped optical fiber has been fundamental for enabling the application of optical fiber systems, such as fiber-based laser systems, to the fields of telecommunications, sensor systems, and electro-optic systems, as well as for industrial applications such as high-speed material cutting, welding, and micromachining, among other applications. In one example, a doped, actively-pumped optical fiber generally consists of a fiber core region including a core material that is doped with a selected dopant for causing lasing of the core material at a selected wavelength. The fiber core region is surrounded by a first cladding region though which pump light is introduced to the fiber, e.g., from one or both ends of the fiber. The pump light in the first cladding region is absorbed by the core region along the fiber length, causing population inversion and lasing of the material in the core region, with the core region carrying the laser light through the fiber. The first cladding region is typically surrounded by a second cladding region that is provided as an outer protective layer for the fiber and to confine the pump light to the first cladding and core regions.

In operation, the core region of a doped, actively-pumped optical fiber generates heat as the input pump signal is converted to a laser signal, and this heating primarily occurs in the core material, due to, e.g., quantum defects of the lasing process and the degree of pump and signal absorption. Because the core region generally has a very large surface-to-volume ratio in a conventional fiber geometry, the heat generated in the core region dissipates to the outer cladding regions of the fiber. This heat generation and dissipation can result in thermal damage of the fiber core material as well as the materials of both the first fiber cladding and second fiber cladding. Heat generation and dissipation can also cause detrimental thermo-optical effects during fiber laser operation, such as multi-mode instability, also referred to as transverse mode instability and modal instability, of the laser signal in the core of the fiber.

Conventionally, a lasing pump signal is introduced into a doped, actively-pumped fiber system through the first cladding layer of the fiber, from one or both ends of the fiber, with the pump light crossing into the fiber core as the pump light progresses down the length of the fiber. In the doped fiber core, the pump energy is absorbed and converted to the target laser wavelength. The geometry and material composition of the fiber core region and the fiber cladding regions are generally homogeneous along substantially the entire length of the fiber, resulting in nonuniform, with respect to length, distribution of pump energy and correspondingly non uniform heat dissipation along the fiber length. The magnitude of this absorption and heating depends on the doping and other characteristics of the fiber materials as well as the choice of pump and target laser wavelengths. The heat that is generated in the doped fiber core occurs at regions of highest signal power and highest gain, i.e., the site of highest conversion of pump to signal power. This is in general relatively near to locations along the length of the doped fiber where pump power is introduced into the first cladding region of the fiber. Thus, there can be regions of fiber along which heat generation is pronounced, and there can exist specific sites along the fiber length at which heat generation is extreme.

Many fiber laser applications, e.g., multi-kW fiber lasers and multi-W amplifiers for industrial material processing and telecommunications, require robust and sustained fiber operation over long durations. But as a result of heating during fiber laser operation, the requirements of many such applications are not attainable with conventional fiber systems. As a result, the design and system limitations imposed by the need to prohibit thermal damage of fiber lasers prohibits the ability to achieve the reliable optical power scaling required by many important fiber applications.

SUMMARY

Herein is provided a fiber draw tower that enables a methodology for producing a fiber having a structure which overcomes the limitations that are conventionally imposed by the need to prohibit thermal damage of a fiber during high-power fiber operation.

With the draw tower and methodology provided herein, there is produced fiber that enables implementation of multi-kW fiber lasers and multi-W amplifiers for modern fiber applications. Specifically, the reduction in heat that the fiber enables provides for superior operation of pulsed fiber lasers and amplifiers in which the fiber length is preferably as short as possible. Applications in materials processing, medicine, e.g., laser surgery, LIDAR, communications, and other fields are thereby enabled. In addition, single mode lasers and amplifiers, pulsed Quasi-CW, and CW, all in which it is preferable to minimize fiber length, are also well-addressed. Material processing applications are also well addressed, for example, for high power, Yb-doped industrial lasers and amplifiers, often exceeding 1 kW in average power, and for high power lasers and amplifiers doped with other dopants, such as erbium. In all of these applications, the reduction in heat dissipation achieved by fiber produced by the fiber draw tower and methodology provided herein enables fiber operation that far surpasses that of conventional fiber configurations. Other features and advantages of the fiber will be apparent from the following description and accompanying figures, and from the claims.

DETAILED DESCRIPTION

Figure 1A:
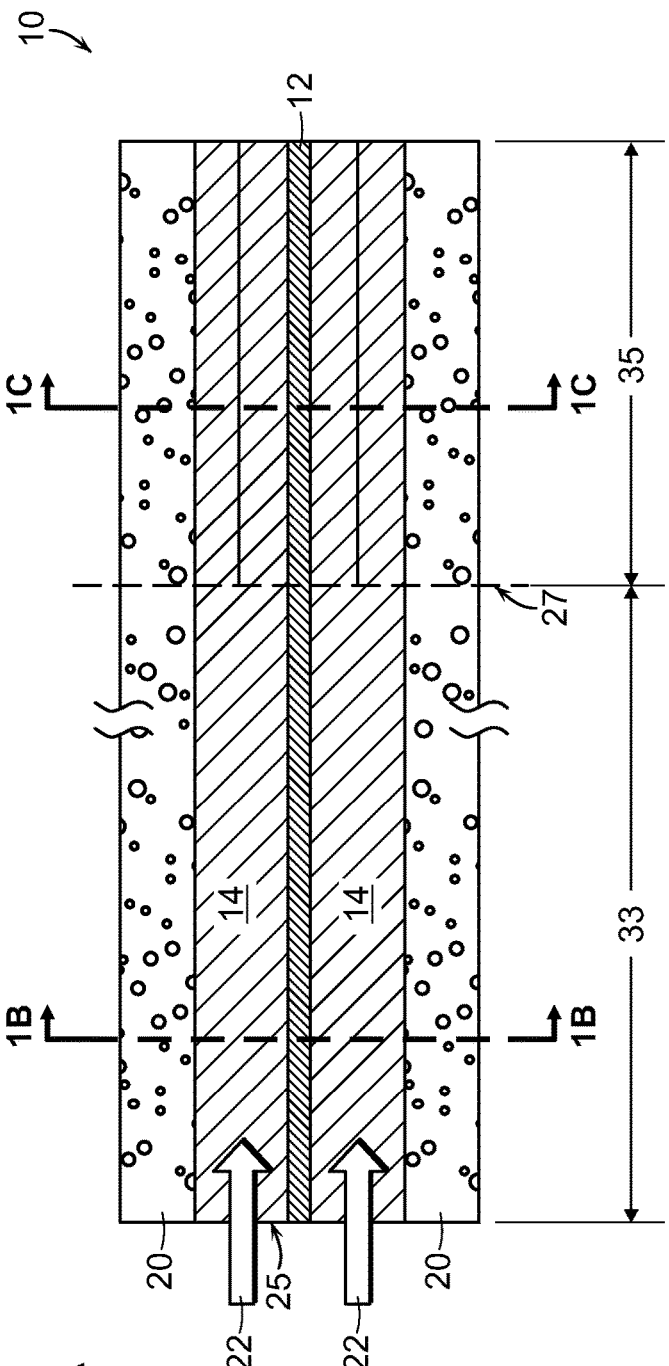
FIG. 1A is a cross-sectional side view of a fiber including a core, first cladding region having a cross-sectional geometry that is changed over the length of the fiber, and a second cladding region.
Figure 1C:
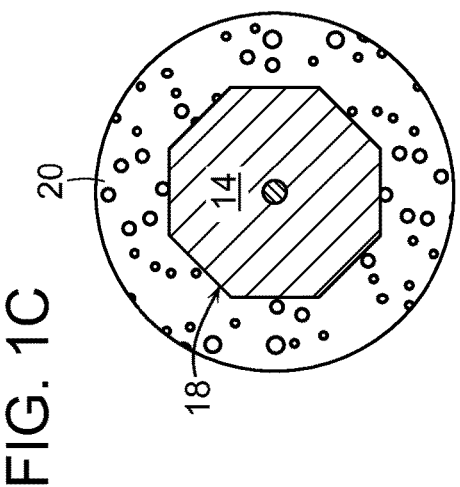
FIGS. 1B-1C are cross-sectional radial views of the fiber of FIG. 1A taken at a site along the fiber at which the first cladding region has a circular cross-sectional geometry and taken at a site along the fiber at which the first cladding region has an octagonal cross-sectional geometry, respectively.
Figure 1B:
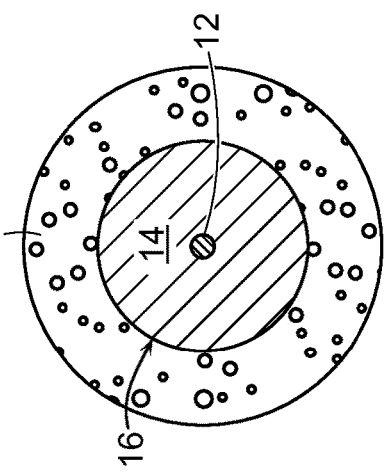

Referring to FIGS. 1A, 1B, and 1C, an active doped fiber 10 provided herein has a length, L, between two ends of the fiber 10 and includes a doped fiber core 12, in which signal light propagates and through which signal light is delivered between the ends of the fiber. The fiber core 12 is surrounded radially by a first cladding region 14 having a first cross-sectional geometry 16 along one or more portions of the fiber length. The first cladding region has a second cross sectional geometry 18 that is different from the first cross-sectional geometry 16 along one or more portions of the fiber length. Additional different cross sectional geometries of the first cladding region can be included along one or more portions of the fiber length. Thus, in one embodiment, the cross-sectional geometry of the first cladding region is changed between at least two different cross-sectional geometries at a site 27 along the length of the fiber. This change can be abrupt or can be gradual. In one embodiment, the cross-sectional geometry of the first cladding region is gradually changed between two different cross-sectional geometries through a transition extent along the length of the fiber. In an alternate embodiment, the cross-sectional geometry of the first cladding region is abruptly changed between two different cross-sectional geometries. Both of these embodiments result in the imposition of at least two different cross-sectional geometries along the length of the fiber.

A second, outer cladding region 20 radially surrounds the first cladding region and provides an outer protective layer for the fiber. The second cladding region material confines the pump light to the first cladding region and the fiber core. The second cladding region and the first cladding region can be provided as the same material or as different materials. The radial cross-sectional geometry of the second cladding region is substantially independent of that of the first cladding region. In one embodiment, the outer diameter of the second cladding region is substantially constant along the fiber length. This constant-diameter second cladding region can be, e.g., circular, or other suitable geometry.

Pump light 22 is introduced to the fiber at one or more pump input sites of the first cladding region 14, such that the pump light is input to the first cladding region 14 for absorption of the pump light into the fiber core region from the first cladding region. In one embodiment, a pump input site 25 is arranged at an end of the fiber. Pump input light can also be introduced to the first cladding region at pump input sites along the fiber length in the manner described below. Wherever the pump light is introduced into the first cladding region, the cross-sectional geometry of the first cladding region affects the degree of absorption of the pump light into the doped fiber core region from the first cladding region. The first cross-sectional geometry 16 of the first cladding region is defined as a cross-sectional geometry that produces a first level of absorption of pump light from the first cladding region into the core, and therefore that produces a first rate of conversion of pump light to signal light per unit length of the fiber. The second cross-sectional geometry 18 of the first cladding region is defined as a cross-sectional geometry that produces a second level of absorption of pump light from the first cladding region into the fiber core, and therefor that produces a second rate of conversion of pump light to signal light. In one embodiment, the second level of absorption of pump light into the fiber core is greater than the first level of absorption of pump light into the fiber core. In an alternative embodiment the second level of absorption of pump light into the fiber core is less than the first level of absorption of pump light into the fiber core.

The first and second cross-sectional geometries of the first cladding layer are selected to produce the two different levels of absorption of pump light into the fiber core. The two first cladding cross-sectional geometries 16, 18 shown in FIG. 1B and FIG. 1C are meant as examples only and are not limiting, and as explained below, other cross-sectional geometries can be employed as-suitable. And as stated above, the first fiber cladding region 14 of the fiber 10 can include more than two different cross-sectional geometries along the fiber length, and can transition between geometries either abruptly or gradually. A range of example cross-sectional geometries are described below. Whatever cross-sectional geometries are selected for the first cladding region of the fiber, at least one of the cross-sectional geometries limits the absorption of pump light into the fiber core to a larger degree than the other or others of the cross-sectional geometries.

Conventionally, a first cladding region having a cross-sectional geometry that includes one more generally flat sections, and that is generally symmetric, as in the octagonal cross-sectional geometry 18 shown in FIG. 1C, tends to enhance the absorption of pump light from the first cladding region to the fiber core. This geometry promotes continual mixing of pump light in the first cladding region and promotes efficient crossing of the light into and through the fiber core region for absorption by the core region. Conversely, a first cladding region having a generally rounded cross-sectional geometry, as in the cross-sectional geometry 16 shown in FIG. 1B, tends to limit absorption of pump light from the first cladding region to the fiber core because with this geometry, the degree of core crossing of the light is reduced.

As pump light is absorbed into the fiber core and converted in the core to signal light, heat is produced in the core and dissipated throughout the fiber, and this heat increases to a peak temperature along the fiber length for at least some portion of the fiber length. Heating of the fiber due to dissipation of heat that is generated internal to the fiber poses a range of limitations for fiber operation. A reduction in peak fiber temperature is therefore desirable for fiber amplifier and fiber laser systems to combat the issues that limit power scaling and the increased heat such can cause, such as damage/failure of the acrylate, or other, outer, second cladding material of the fiber; the cost and complexity of localized fiber cooling scenarios, and multimode instability (MMI) that is caused by increased fiber core temperatures.

In the fiber 10 provided herein, the cross-sectional geometry of the first cladding region cross-sectional geometry is controlled along the fiber length to cause reduced pump light absorption at one or more sites or along one or more portions of the fiber length so that the heat generated at the one or more sites or along the one or more portions is reduced from that which would otherwise be produced by a cross sectional geometry that would be more favorable to pump light absorption by the fiber core. In the example cross-sectional geometries shown in FIG. 1B-1C, the pump light absorption efficiency per unit length for the octagonal geometry 18 is about twice the pump light absorption efficiency per length for the circular geometry 16 when the pump light is introduced from a pump input site in the first cladding region. Similar differences in pump light absorption efficiency are achieved between pentagonal, hexagonal, spiral, D-shaped, and other cross-sectional geometries, compared with a circular geometry. Therefore, the sites along or portions of a fiber length at which the first cladding region has a circular cross-sectional geometry has less pump light absorption, and less heating, than the sites along or portions of a fiber length at which the first cladding region has a cross-sectional geometry that is non-circular, e.g., including one or more flats around the periphery of the region. In the example embodiment of FIGS. 1A-1C, a low-absorption length 33 along the fiber starting from the end pump input site has a circular cross-sectional geometry that is relatively low-absorbing, while a high-absorption length 35 along the fiber, past the transition site 27, has a non-circular cross-sectional geometry that is relatively high-absorbing.

No particular cross-sectional geometry, and no particular number of different cross-sectional geometries, is required for the first cladding layer of the fiber. All that is required is at least two different cross-sectional geometries, one of which limits the degree of pump light absorption into the fiber core from the first cladding layer more than the other cross-sectional geometry. FIGS. 2A-E illustrate examples of first cladding region cross-sectional geometries that control pump light absorption from the first cladding layer to the fiber core, to differing degrees. For clarity, the doped fiber core 12 and the second cladding region 20 are not shown, but it is to be understood that the doped fiber core and second cladding region are present in all examples.

Figure 2A:
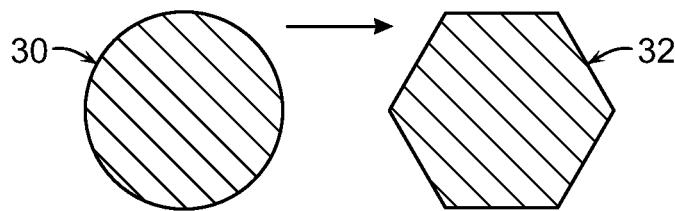
FIGS. 2A-2E are schematic cross-sectional views of example pairs of cross-sectional geometries of a fiber first cladding region between which the cross-sectional geometry of the fiber first cladding region can shift.
Figure 2B:
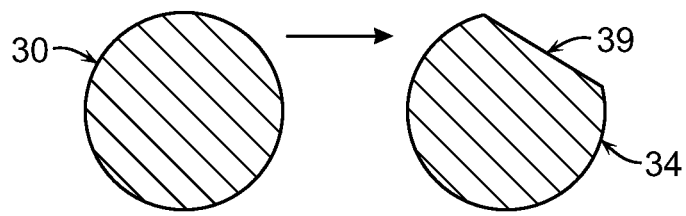
Figure 2C:
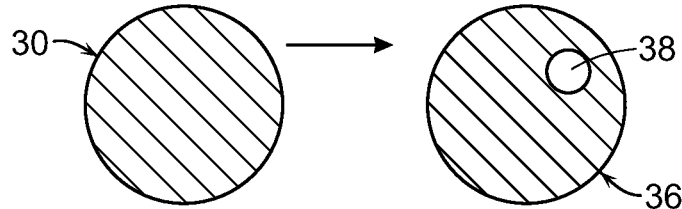
Figure 2D:
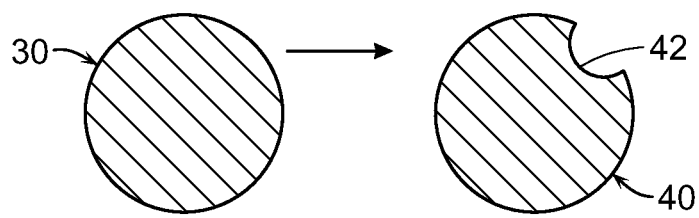

In one embodiment, shown in FIG. 2A, the cross-sectional geometry of the first cladding region includes a low-absorption cross-sectional geometry 30 that is generally circular and a high-absorption cross-sectional geometry 32 that is one of octagonal, hexagonal, and pentagonal. In a further embodiment, shown in FIG. 2B, the cross-sectional geometry of the first cladding region includes a low-absorption cross-sectional geometry 30 that is generally circular and a high-absorption cross-sectional geometry 34 that is also generally circular but that further includes one or more substantially flat regions 39 around the circumference of the geometry. In a further embodiment, shown in FIG. 2C, the cross-sectional geometry of the first cladding region includes a low-absorption cross-sectional geometry 30 that is generally circular and a high-absorption cross-sectional geometry 36 that is also generally circular but that further includes at least one opening, such as a hole 38, in the cross section. In a further embodiment, shown in FIG. 2D, the cross-sectional geometry of the first cladding region includes a low-absorption cross-sectional geometry 30 that is generally circular and a high-absorption cross-sectional geometry 40 that is also generally circular but that further includes at least one perimeter asperity, such as a perimeter notch 42, at one or more sites around the perimeter.

Figure 2E:
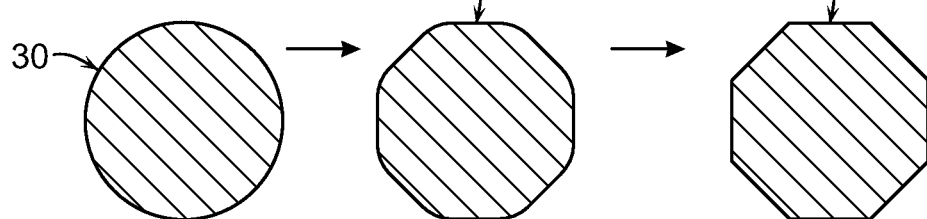

The transition between two or more cross-sectional geometries can be abrupt, as in FIG. 2A, or can be gradual, as shown in FIG. 2E. In this further embodiment, the cross-sectional geometry of the first cladding region includes a low-absorption cross-sectional geometry 30 that is generally circular and two or more intermediate cross-sectional geometries 44 before a final high-absorption cross-sectional geometry 46 in the transition. In further embodiments, the cross-sectional geometry of the first cladding region includes a first cross-sectional geometry that is not circular, e.g., that is one of the high-absorption geometries 32, 34, 36, 40, 44, 46 in FIGS. 2A-2E, and a second cross-sectional geometry that is a generally circular, low-absorption geometry.

In one embodiment, the cross-sectional geometry of the first cladding region is changed from a first, high pump light-absorption geometry to a second, low pump light-absorption geometry, at one or more locations or portions of the fiber length. This reduces the W/m fiber heating that would otherwise occur without use of the low pump signal-absorption geometry. In an alternate embodiment, the cross-sectional geometry of the first cladding region is changed from a first, low pump light-absorption geometry to a second, high pump light-absorption geometry, at one or more locations or portions of the fiber length, to reduce the W/m fiber heating everywhere except the locations of the high pump light-absorption geometry.

The location of the change in cross-sectional geometry of the first cladding region, between two different geometries, is preferably determined based on the rate and degree of absorption of input pump light into the doped fiber core. The fiber core material can be any suitable material, such as a silica-based glass or a fluoride-based glass, and can be doped with, e.g., ytterbium, erbium, praseodymium, neodymium, and tellurium. This core material and dopant sets the absorption properties of the core. The choice of the doped length, which is referred to as the active fiber length for a fiber amplifier or fiber laser, is influenced by many variables. Some of the main criteria include, e.g., cost of the fiber, $/meter and optical non-linearities in the fiber, which generally scale non-linearly with the length of the fiber. Most optical nonlinearities, such as stimulated Brillouin scattering (SBS), stimulated Raman scattering (SRS), and four-wave mixing (FWM), are unwelcome, and as a result there is often an upper limit on fiber length to avoid or minimize such. Conversely, pump light absorption and conversion of pump power to signal power, scale with the length of the fiber; if the fiber is too short then a laser or amplifier in which the fiber is implemented is inefficient. Signal loss and signal re-absorption are also important because at very long fiber lengths the signal stops being amplified and the additional fiber length causes signal loss due to attenuation of signal and also due to re-absorption of the signal by the doped fiber. This places an upper limit on the useful length of the doped fiber of a gain stage in a fiber laser or amplifier. In addition, the choice of the pump light wavelength or wavelengths to be injected into the first cladding region, the pump light power, as well as the signal power and signal wavelength or wavelengths, determine the rate of pump absorption and signal gain. Taking all the above criteria into account, there are generally accepted design criteria that can be employed in the conventional manner to select a doped fiber length for maximized, or close to maximum, efficiency in converting pump energy to signal energy for a given fiber application.

In embodiments provided herein, the extent of each cross-sectional geometry that is imposed on the first cladding region along the fiber length is determined based on the percentage of input pump light absorption into the fiber core that is prescribed to be achieved along that extent. In general, in this analysis, the percentage of input pump light absorption into the fiber core is calculated as a function of position along the fiber length to make this determination. Input pump light absorption can be calculated using commercially-available fiber amplifier/laser modeling software, or general mathematical software that is programmed to calculate optical effects, as will be understood by those skilled in the art, for selected power and wavelength specifications. For example, pump light absorption can be modeled and analyzed with the modeling software RP fiber Power, from RP Photonics Consulting, GmbH, Waldstr 17, 78073 Bad Durrheim, Deutschland; with the modeling software OptiSystem 14.2, from Optiwave Systems, Inc., Ottawa, ON, Canada; or with the modeling software RSoft from Synopsys, Inc., Mountain View, Calif.; or with the mathematical software MatLab, from the MathWorks, Natick, Mass.

Alternatively, input pump light absorption into the fiber core can be experimentally measured. Here, the power at a source of input pump light is first measured, e.g., with an optical power meter, and then the pump light is introduced to the doped fiber at an input pump site, such as an end of the fiber, into the first cladding region. At the far end of the fiber, where residual, i.e., un-absorbed, pump light power is output, an external filter or other optical element is arranged to block wavelength(s) other than those of the pump reaching an optical power meter at end of the fiber. The residual, un-absorbed pump power at the far end can then be measured. The percentage of pump light absorption is then given as a percentage as 100%×(1−[Output pump power/Input pump power]).

Figure 3:
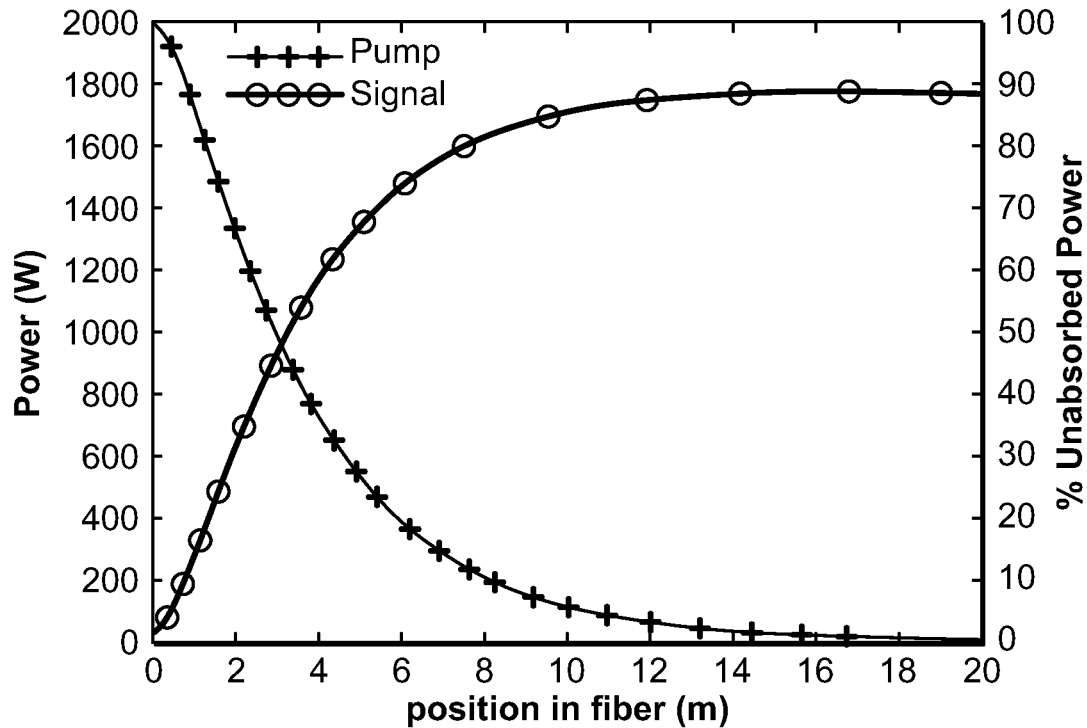
FIG. 3 is a plot of pump and signal power in a fiber as a function of position along the fiber length for an end-pumped, co-propagating fiber amplifier with an octagonal first cladding region cross sectional geometry along the entire fiber length.

FIG. 3 is a plot of pump and signal light power along an end-pumped, co-propagating fiber, i.e., a fiber with co-propagating pump and signal light, configured as a fiber amplifier. The power is plotted as a function of position along the fiber length. The fiber includes a first cladding region that is octagonal in cross-section as in FIG. 1C, along the entire fiber length, or 100% of the fiber length. This plot refers to conditions in which the pump light is launched into the first cladding region with a pump power of 2000 W at a wavelength of 976 nm and with an input signal power of 10 W at a wavelength of 1064 nm. The fiber has a core that is ytterbium-doped along its length, having first cladding pump absorption coefficient of 0.46 dB/meter at 915 nm, with a 25 µm-diameter core, and a 400 µm-diameter first cladding region.

This plot provides a determination of input pump light absorption along a selected extent of fiber length. For example, as shown in the plot, 95% of the input pump light, i.e., all input pump light except for about 100 W of the input pump light, is absorbed into the fiber core within about 10 m along the fiber length. As shown in the plot, 10% of the pump power is absorbed within about 1 m along the fiber length; the input pump power is reduced from a starting power of 2000 W at the 0 m position to about 1800 W at about the 1 m position. Thus, there can be determined what percentage of input pump power is absorbed by the fiber core for a given set of fiber conditions, here for an all-octagonal first cladding geometry.

Figure 4:
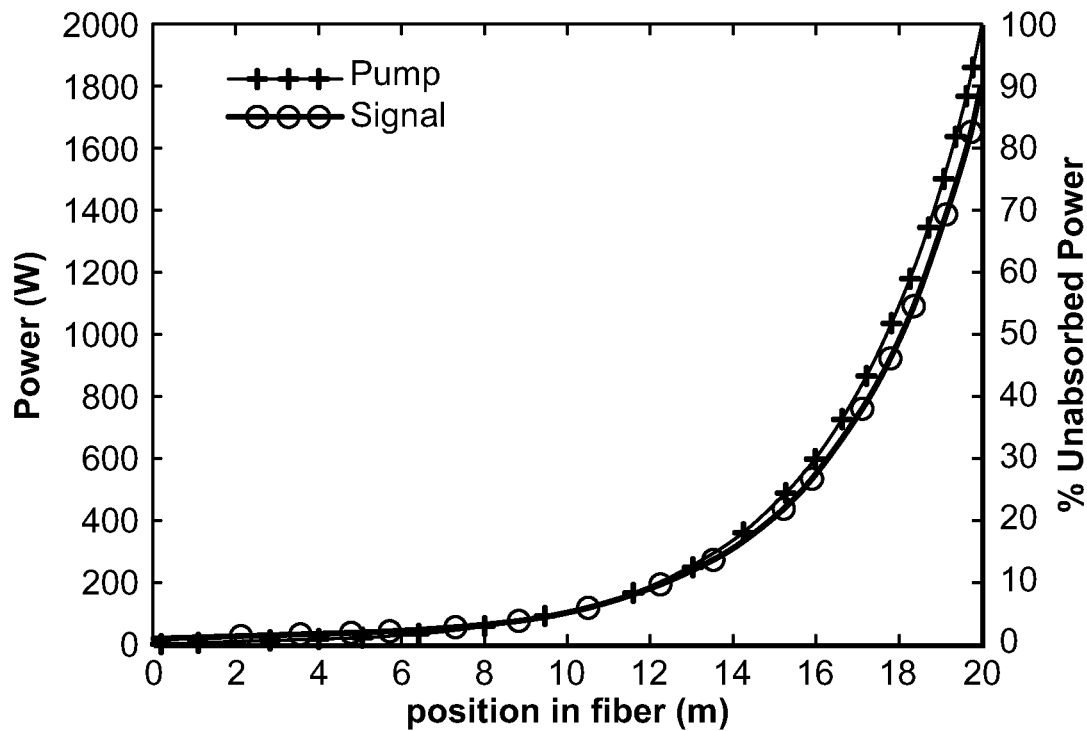
FIG. 4 is a plot of pump and signal power in a fiber as a function of position along the fiber length for an end-pumped, counter-propagating fiber amplifier with an octagonal first cladding region cross sectional geometry along the entire fiber length.

FIG. 4 is a plot of pump and signal light power along an end-pumped, counter-propagating fiber amplifier as a function of doped fiber length. The fiber includes a first cladding region that is octagonal in cross-section as in FIG. 1C, along the entire fiber length, or 100% of the fiber length. This plot refers to conditions in which the input pump light is launched into the first cladding region with a pump power of 2000 W at a wavelength of 976 nm with an input signal power of 10 W at a wavelength of 1064 nm. The fiber has a core that is ytterbium-doped, having first cladding pump absorption coefficient of 0.46 dB/meter at 915 nm, with a 25 µm-diameter core, and a 400 µm-diameter first cladding region. As shown in the plot, 10% of the pump power is absorbed within about 0.5 m along the fiber length; the input pump power is reduced from a starting power of 2000 W at the 20 m position to about 1800 W at about the 19.5 m position along the fiber length.

Figure 5:
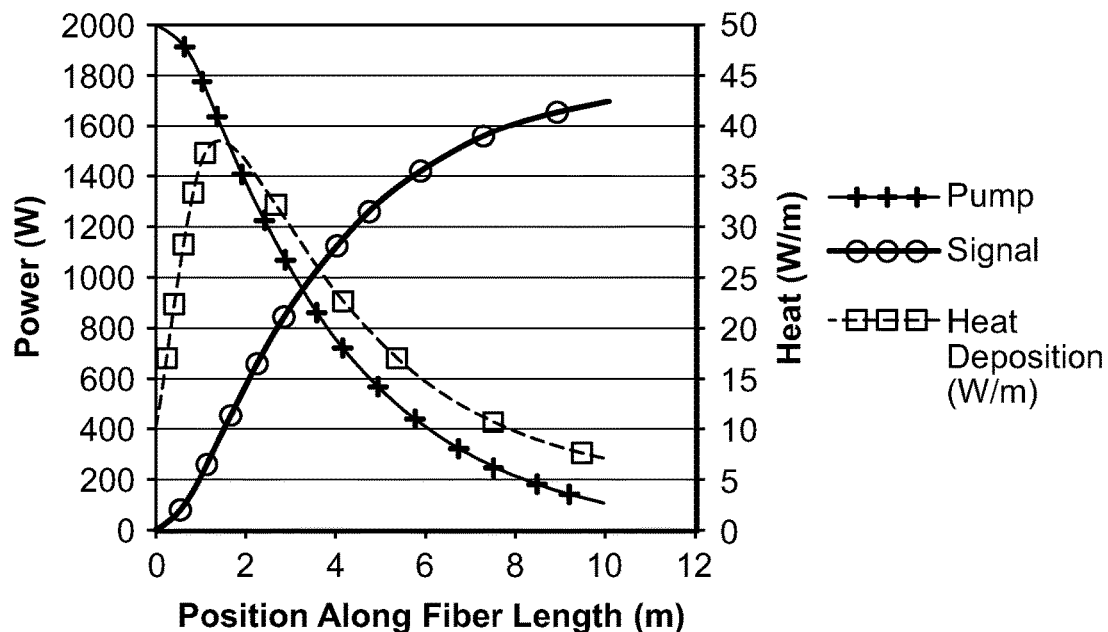
FIG. 5 is a plot of pump and signal power and heat deposited in a fiber as a function of position along the fiber length for an end-pumped, co-propagating fiber amplifier with an octagonal first cladding region cross sectional geometry along the entire fiber length.

Now turning to analysis for determining the preferred location and extent of low pump-absorption geometry for the first cladding region along a doped fiber length, consider an example of a fiber including a ytterbium-doped fiber core operated with co-propagating pump and signal light and having an octagonal cross-sectional geometry for the first cladding region, as in FIG. 1C, along the entire fiber length, or 100% of the fiber length. FIG. 5 is a plot of the pump light power, the signal light power, and the heat deposited in the fiber from the core, along the fiber length, for this fiber arrangement. This plot refers to conditions in which input pump light is launched into the first cladding region with a pump power of 2000 W at a wavelength of 976 nm and an input signal power of 10 W at a wavelength of 1064 nm. The fiber has a core that is ytterbium-doped, having a first cladding pump absorption coefficient of 0.46 dB/at 915 nm, with a 25 µm-diameter core, and a 400 µm-diameter first cladding region. As shown in the plot, 10% of the pump power is absorbed within about 1 m along the fiber length, that is, 200 W of the input pump power of 2000 W is absorbed within about 1 m, reducing the pump power to 1800 W at about 1 m along the fiber length. Also as shown in the plot, the peak fiber heating that occurs in the fiber is about 38 W/m, referring to the right hand vertical axis of the plot, occurring at a little less than 2 m from the start of the fiber length.

Figure 6:
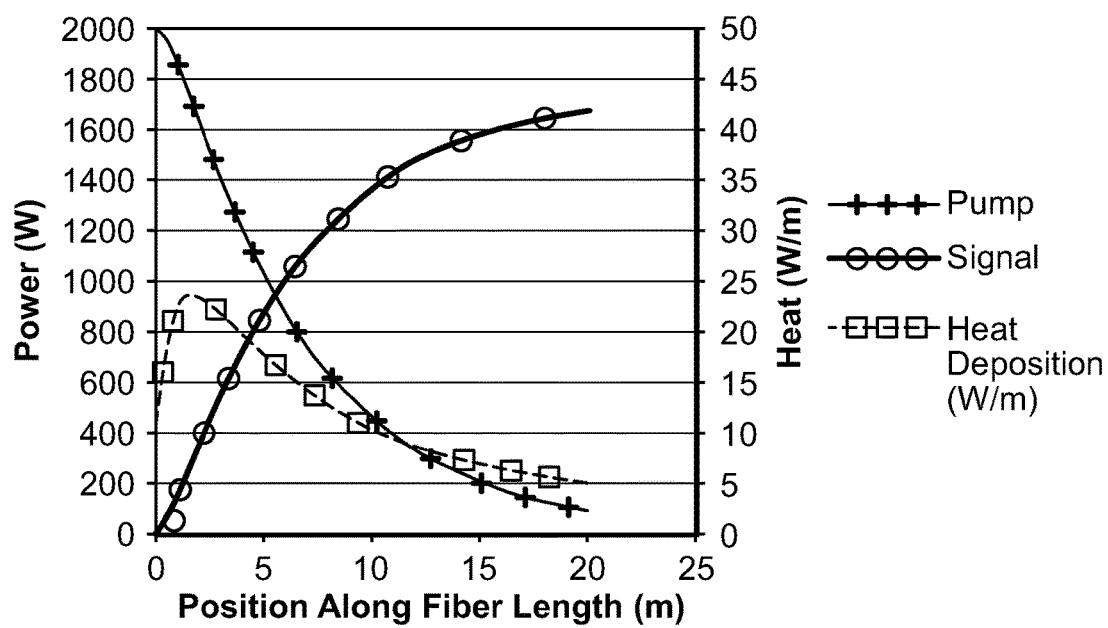
FIG. 6 is a plot of pump and signal power and heat deposited in a fiber as a function of position along the fiber length for an end-pumped, co-propagating fiber amplifier with a circular first cladding region cross sectional geometry along the entire fiber length.

Now consider a fiber including a ytterbium-doped fiber core operated with co-propagating pump and signal light and having a circular cross-sectional geometry, rather than octagonal geometry, for the first cladding region, as in FIG. 1B, along the entire fiber length, or 100% of the length. FIG. 6 is a plot of the pump light power, the signal light power, and the heat deposited in the fiber from the core, along the fiber length for this fiber. This plot refers to conditions in which input pump light is launched into the first cladding region with a pump power of 2000 W at a wavelength of 976 nm and an input signal power of 10 W at a wavelength of 1064 nm. The fiber has a core that is ytterbium-doped, having a first cladding absorption coefficient of about 0.23 dB/meter at 915 nm, with a 25 µm-diameter core, and a 400 µm-diameter first cladding region. As shown in the plot, 10% of the input pump power is absorbed within about 1.3 m along the fiber length; that is, about 200 W of the input power of 2000 W is absorbed by about 1.3 m along the fiber length, reducing the residual pump power to 1800 W at 1.3 m along the fiber length. Also shown in the plot, the peak fiber heating is about 24 W/m, occurring at about 1.5 m from the start of the fiber length.

Comparing the fiber absorption shown in the plot of FIG. 5 with the fiber absorption shown in the plot of FIG. 6, it is found that to obtain a selected input pump light absorption and output signal power, a fiber having a circular first cladding region cross section must be about twice as long as a fiber having an octagonal first cladding region cross section, both along the entire fiber length. For many applications the required added length for a circular first cladding region is non-ideal because additional fiber length generally costs more, making the fiber product more expensive, and further because additional fiber length increases the effective length for optical non-linearities, which can cause power scaling limits and/or reduce optical performance.

Considering these factors, in one embodiment of the fiber provided herein, there is employed a low pump-absorption geometry, such as a circular geometry, for the first cladding region, extending along a low-absorption length of the fiber from at or near to a pump input site to an extent over which at which at least about 10% of input pump power, i.e., 10% of the input pump light, can be absorbed from the first cladding region to the doped fiber core measured from the fiber end or other fiber site at which the input pump light is launched. For example, if 10% of the input pump light power is absorbed in the first 1 m of fiber from where the input pump light is launched, then a circular first cladding region is imposed along the same 1 m of the fiber length, beginning where the pump light is launched. This configuration produces a noticeable and useful reduction of the peak heating (W/m) in the fiber.

In a related embodiment of the fiber provided herein, there is employed a low pump-absorption geometry, such as a circular geometry, for the first cladding region, along a low-absorption length along the fiber having an extent over which at least about 15% of input pump light can be absorbed into the doped fiber core, measured from at or near to the fiber end or other fiber site at which the input pump light is launched into the fiber. In a further embodiment, there is employed a low pump-absorption geometry, such as a circular geometry, for the first cladding region, along a low-absorption fiber extent having a length over which about 20% of input pump light can be absorbed into the doped fiber core, measured from the fiber end or other fiber site at which the input pump light is launched into the doped fiber.

In a further embodiment, a low pump absorption-geometry of the first cladding region extends along a section of the fiber over which least about 30% of input pump light can be absorbed, or can extend along a fiber portion having a length over which at least about 40% of input pump light can be absorbed, measured from at or near to the fiber end or other fiber site at which the input pump light is launched into the doped fiber. In a further embodiment, a low pump-absorption geometry for the first cladding region is employed over a section of the fiber length, at or near to a pump light input, along an extent over which between about 10% and about 40% of input pump light can be absorbed from the first cladding region into the doped fiber core.

In a further embodiment, a reduced pump-absorption cross-sectional geometry, such as a circular cross-sectional geometry, is imposed on the first cladding region starting at or near to the fiber end or other site along the fiber that is known to be the site of highest un-absorbed input pump power, and continuing in the direction of travel of the pump light for an extent over which at least about 10% of the pump light can be absorbed from the first cladding region to the fiber core. In a further embodiment, a reduced pump-absorption cross-sectional geometry, such as a circular cross-sectional geometry, is imposed on the first cladding region starting at the site along the fiber after which about 30% of input pump light can be absorbed into the fiber core from the first cladding region, and continuing in the direction of travel of the pump light as a low-absorption length, for an extent over which no more than about 80% of the pump light can be absorbed from the first cladding region to the fiber core, or for an extent over which no more than about 90% of the pump light can be absorbed from the first cladding region to the fiber core. The low-absorption length thereby extends from a site at which 30% of has been absorbed to a site at which about 80% or 90% of input pump light is absorbed into the doped fiber core.

For implementations in which the pump light is injected at sites along the length of the fiber at one or more non-end positions, each fiber interval between pumps is to be considered separately. The site along the fiber at which the cross-sectional geometry change starts is herein defined as the site at which the geometry begins to change gradually or changes abruptly.

In further embodiments, the reduced pump-absorption cross-sectional geometry is imposed on the first cladding region starting at the fiber end or other site along the fiber that is known to be the site for highest un-absorbed input pump power, and continuing in the direction of travel of the pump light for an extent over which at least about 20% of the pump power can be absorbed from the first cladding region to the fiber core; for an extent over which at least about 30% of the pump power can be absorbed from the first cladding region to the fiber core, for an extent over which at least about 40% of the pump power can be absorbed from the first cladding region into the fiber core, or for an extent over which at least about 50% of the pump power can be absorbed from the first cladding region to the fiber core.

Figure 7:
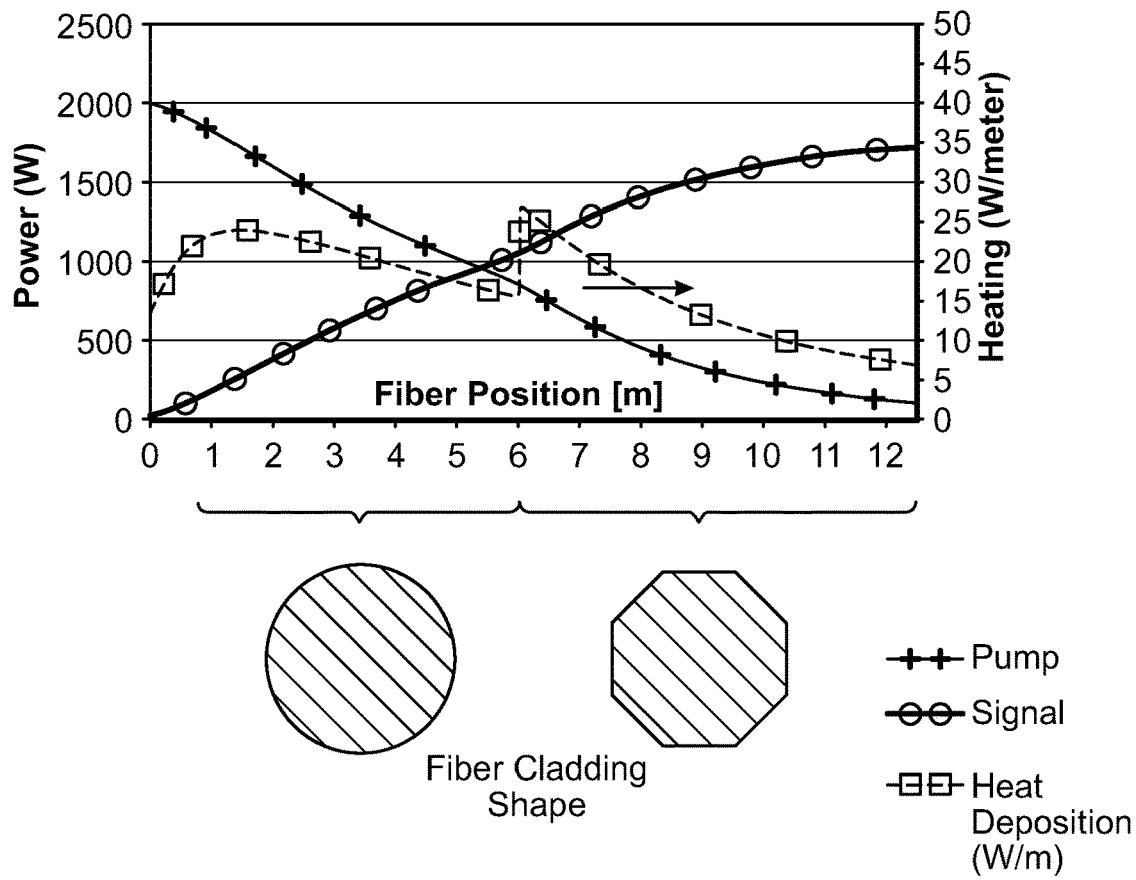
FIG. 7 is a plot of pump and signal power and heat deposited in a fiber as a function of position along the fiber length for an end-pumped, co-propagating fiber amplifier with a circular first cladding region cross sectional geometry along a fiber length up until 6 m and an octagonal first cladding region cross-sectional geometry for the remainder of the length.

Now considering one example of this embodiment, a 12.5 m-long effective doped length of fiber is configured with co-propagating pump light in the first cladding region and signal light in the doped fiber core. The input pump light is launched into the first cladding region with a pump power of 2000 W at a wavelength of 976 nm and an input signal power of 10 W at a wavelength of 1064 nm. The fiber has a core that is ytterbium-doped, at about the same concentration across the entire length of the 12.5 m fiber with a 25 µm-diameter core. FIG. 7 is a plot of the pump light power, the signal light power, and the heat deposited in the fiber from the core, along the fiber length, for this fiber configuration.

Turning to FIG. 7, this example fiber has two differing first cladding region cross-sectional geometries across the length of the fiber, as shown in FIG. 7. Along the fiber length from one end, at 0.0 m, to a site at 6.0 m, i.e., from the input end to 6.0 m along the fiber length, the first cladding region is shaped with a low-absorption circular cross-sectional geometry. This geometry has a first cladding absorption coefficient of about 0.23 dB/meter at 915 nm, with an effective doped fiber length for about 95% pump absorption of 20 m, based on the analysis given above and shown in the FIG. 6. At fiber positions between 6.0 m and 12.5 m the first cladding region is shaped with a high-absorption octagonal cross-sectional geometry. This geometry has a first cladding absorption coefficient of about 0.46 dB/meter at 915 nm an effective doped fiber length for about 95% pump absorption of 10 m, based on the analysis given above and shown in the FIGS. 5. At the fiber position of 6 m about 57% of the pump power has been absorbed; here the 2000 W input pump power is reduced to about 860 W.

In this embodiment, for about 50% of the fiber length, the first cladding region is shaped with the low-absorption circular geometry to reduce heat dissipation in the fiber; 6 m/12.5 m of the fiber length. For each of the two geometries, the first cladding region is 400 µm in diameter. As shown in the plot, 95% of the pump light, i.e., all input pump light except for about 100 W, is absorbed into the fiber core within about 12.5 m of fiber length. The peak fiber heating is about 27 W/m. This is significantly less than the 38 W/m demonstrated in the all-octagonal cladding fiber, the results of which were shown in FIG. 5 above, and this is only slightly greater than the 24 W/m heating produced in an all-circular first cladding region.

In this example the site of the cross-sectional geometry change is at 6.0 m of the 12.5 m total length of this design, which also corresponds to the absorption of about 55% of the pump. The peak fiber heating, which occurs along the extent of the circular first cladding region cross section, is at 1.5 m, which corresponds to about 15% pump power absorption. 10% of the input pump power is absorbed at a fiber position of about 1.1 m.

Figure 8:
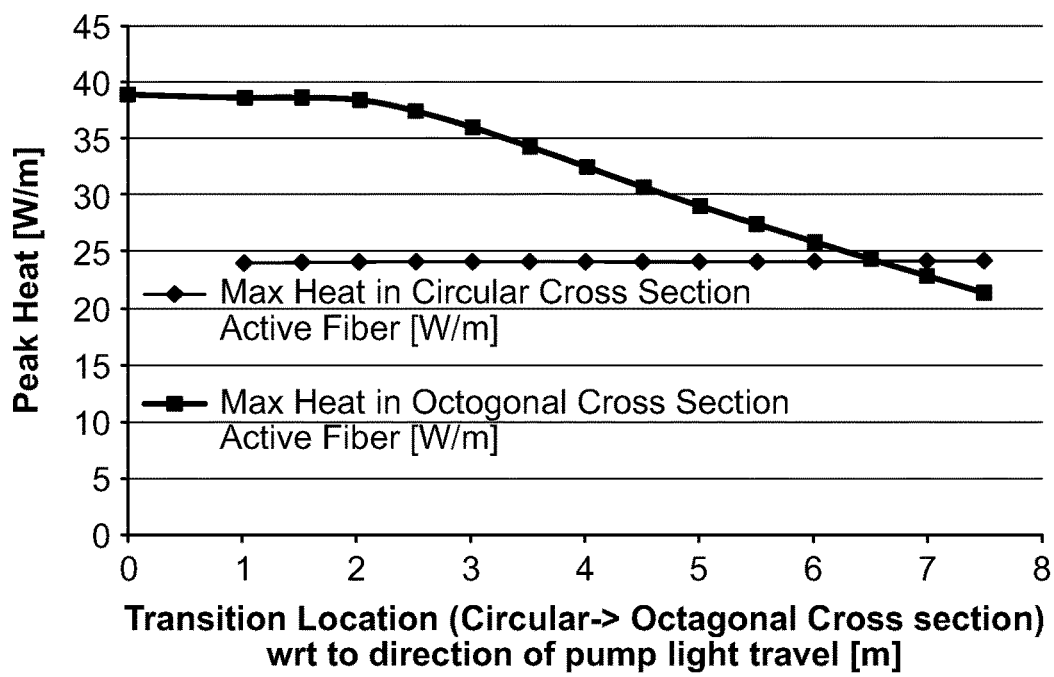
FIG. 8 is plot of the peak heat dissipated along a portion of a fiber having a circular cross-sectional cladding, for a different site, in meters, along an effective fiber length at which the first cladding region cross section changes from circular to octagonal, and each data point in the second line represents the peak heat dissipated along a portion of a fiber having an octagonal cross-sectional cladding, for a different site, in meters, along an effective fiber length at which the first cladding region cross section changes from circular to octagonal.

Considering further the impact of the selection of a particular site location along fiber length for a change between low and high pump-absorption cross-sectional geometry for the first cladding region, consider the plot of FIG. 8. This plot refers to conditions in which input pump light is launched into the first cladding region with a pump power of 2000 W at a wavelength of 976 nm and a co-propagating input signal power of 10 W at a wavelength of 1064 nm. The fiber has a core that is ytterbium-doped, having an absorption coefficient of 0.46 dB/meter at 915 nm, with a 25 µm-diameter core. The first cladding region is 400 µm in diameter, for both circular and octagonal geometries.

Each data point in the lower line plotted in FIG. 8 represents the peak heat dissipated along a portion of a fiber having a circular cross-sectional cladding, as a function of the distance, in meters, along the fiber at which the first cladding region cross section changes from circular to octagonal. Each data point plotted in the upper line represents the peak heat dissipated along a portion of a fiber having an octagonal cross-sectional cladding, also as a function of the distance, in meters, along the fiber at which the first cladding region cross section changes from circular to octagonal. The plot of FIG. 8 is particularly useful for analyzing a given fiber system to determine an optimum design of the first cladding region geometry. A suitable commercial mathematical simulation program can be employed to achieve meaningful simulation results, as described above.

Figure 9:
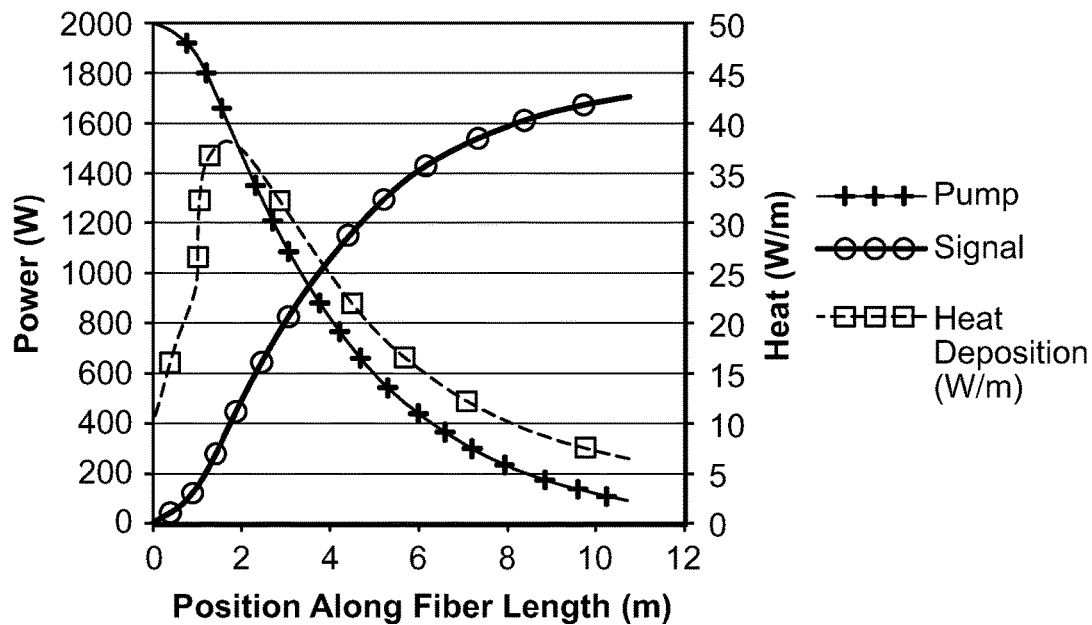
FIG. 9 is a plot of the pump light power, the signal light power, and the heat deposited in a for a fiber having a change in cross-sectional geometry of the first cladding region from circular to octagonal at the position where 5% of the pump power has been absorbed, which is 1.0 meters.

FIG. 9 is a plot of the pump light power, the signal light power, and the heat deposited in the fiber from the core, along fiber length, for a fiber having a change in cross-sectional shape of the first cladding region at the site where about 10% of the pump power absorption has occurred, which is 1.0 meters. The conditions of this fiber operation are that the input pump light is launched into the first cladding region with a pump power of 2000 W at a wavelength of 976 nm and an input signal power of 10 W at a wavelength of 1064 nm. The fiber has a core that is ytterbium-doped, at about the same concentration across the entire length of the 10 m fiber with a 25 µm-diameter core, with a 25 µm-diameter core, and a 400 µm-diameter first cladding region.

As shown in this plot, the peak heating of the fiber is about 38 W/m at just before 2 m along the fiber length. This is nearly identical to the peak fiber heating that occurs in a fiber having an all-octagonal first cladding region along its entire length. This result demonstrates that for many applications there may not be much advantage to set the shape change location at the position where about 10% or less the pump power absorption occurs.

Figure 10:
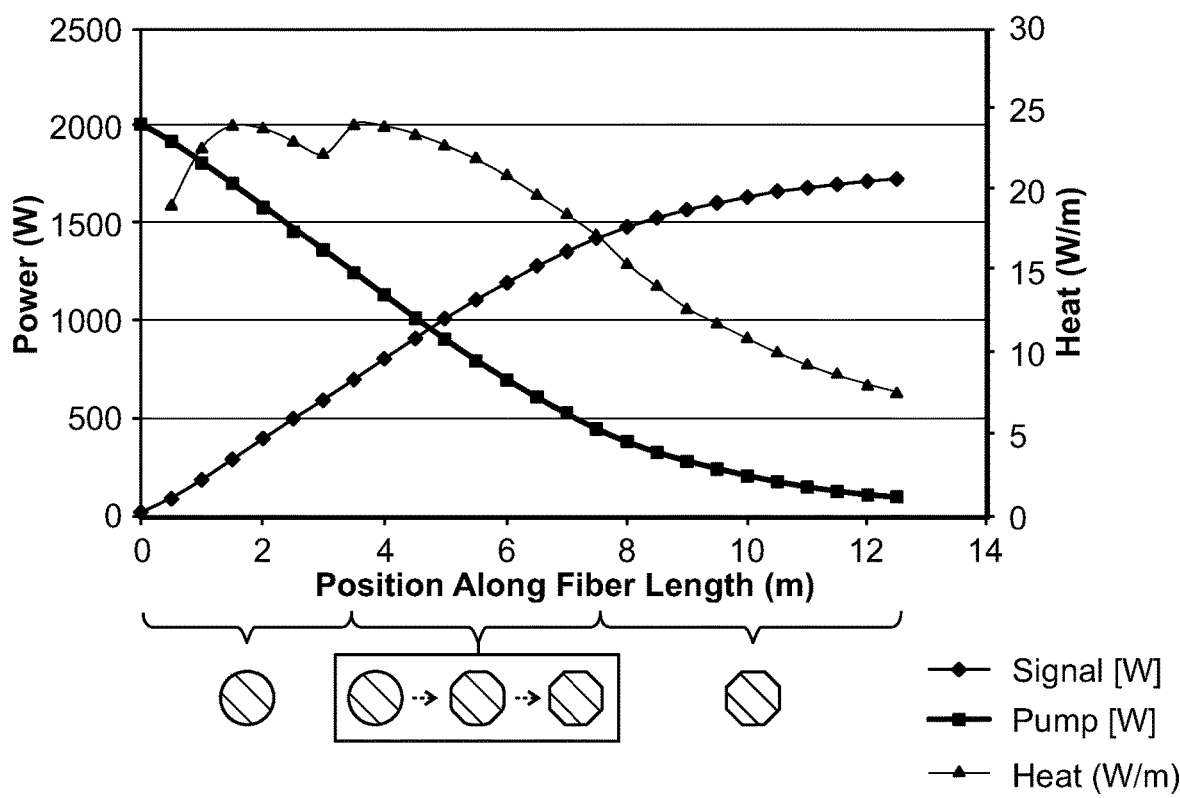
FIG. 10 is a plot of the pump light power, the signal light power, and the heat deposited in a for a fiber having a gradual change in cross-sectional geometry of the first cladding region from circular to octagonal between 3.5 m and 7.5 m from a first end of the doped fiber.

FIG. 10 is a plot of the pump light power, the signal light power, and the heat deposited in the fiber from the core, along the fiber length, for a fiber having a gradual change in cross-sectional shape of the first cladding region. The first cladding region has circular a cross section from the first end of the doped fiber to a site at about 3.5 m from the end of the doped fiber, with a first cladding absorption coefficient of about 0.23 dB/meter at 915 nm. For positions along the fiber length between 3.5 m and 7.5 m, the cross-sectional geometry of the first cladding layer is gradually changed from circular to octagonal, having a first cladding absorption coefficient that changes from about 0.23 dB/meter to 0.46 dB/meter at 915 nm. The cross-sectional geometry change ends at 7.5 m from the end of the doped fiber. Thus, the cross section of the first cladding region is circular from the first end of the fiber to 3.5 m, then transitions to octagonal between 3.5 m and 7.5 m, and then is octagonal from 7.5 m onward, with a first cladding absorption coefficient of about 0.46 dB/meter at 915 nm. The peak heating is about 24 W/m and is shown in the plot to occur at both about 2 m and about 3.5 m along the fiber length.

At 3.5 m along the fiber length, where the cross-sectional geometry transitions begins, there has been a 40% absorption of pump power. This geometric transition point at 3.5 m causes a new heat peak at about 4 m, which is about the same as the heat peak occurring in an all-circular first cladding region at a position of about 2 m. With this similar heat peak, the fiber material is likely to be at the same failure level in both locations and so is shown to be somewhat optimum. If one heat peak was lower or higher than the other, then it would be indicated that the overall length of the fiber was longer than it could be optimized for. For example, if the geometry transition was started at a fiber position much greater than 3.5 m, then the second heat peak would be lower than the 24 W/m level of the heat peak at about 2 m and the overall fiber length would have to be longer than optimum because the circular first section of fiber is less efficient at pump absorption. If the geometry transition started between about 2 m and about 3.5 m, then the second heat peak would be higher than the 24 W/m of the first peak at about 2 m and that would be a new hot spot in the fiber, which could cause detrimental operational issues. If the geometry transition started at less than 2 m, the fiber operation would be very similar to the case of a fiber having an all-octagonal first cladding region and the first heat peak would be much great greater than 24 W/m, which is the unwanted condition of conventional doped fiber.

Figure 11:
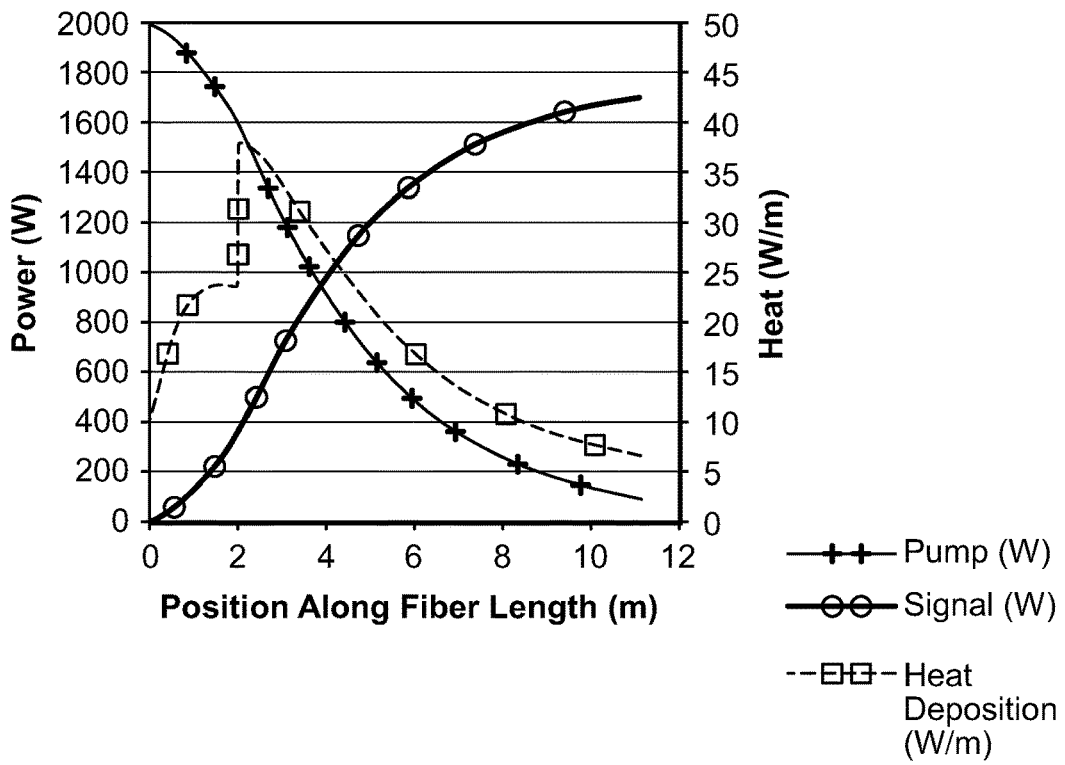
FIG. 11 is a plot of the pump light power, the signal light power, and the heat deposited in a for a fiber having a change in cross-sectional geometry of the first cladding region from circular to octagonal at the position where 20% of the pump power has been absorbed, which is 2.0 meters.

FIG. 11 is a plot of the pump light power, the signal light power, and the heat deposited in the fiber from the core, along fiber length, for a fiber having a change in cross-sectional shape of the first cladding region at the fiber position where about 20% of the pump power absorption has been achieved. This plot refers to conditions in which the input pump light is launched into the first cladding region with a pump power of 2000 W at a wavelength of 976 nm and an input signal power of 10 W at a wavelength of 1064 nm. The fiber has a core that is ytterbium-doped, at about the same concentration across the entire length of the 10 m fiber with a 25 µm-diameter core, and a 400 µm-diameter first cladding region.

The first cladding region of this fiber has a circular cross-sectional geometry for fiber positions from 0.0 m to 2.0 m, with a first cladding absorption coefficient of about 0.23 dB/meter at 915 nm, and the first cladding region has an octagonal cross section for fiber sites from 2.0 m along the fiber onward, with a first cladding absorption coefficient of about 0.46 dB/meter at 915 nm. The plot shows that the peak heating in the fiber reaches about 38 W/m at 2 m along the fiber length. This is not any improvement over a fiber having a first cladding region that is octagonal for the entire fiber, and shows that positioning of the site for change in first cladding region shape at the fiber position where about 20% of the pump power has been absorbed, may not useful for many applications. This demonstrates that there exists a wide range of possible sites for change in cross-sectional geometry but not all possible sites may be optimal.

Figure 12:
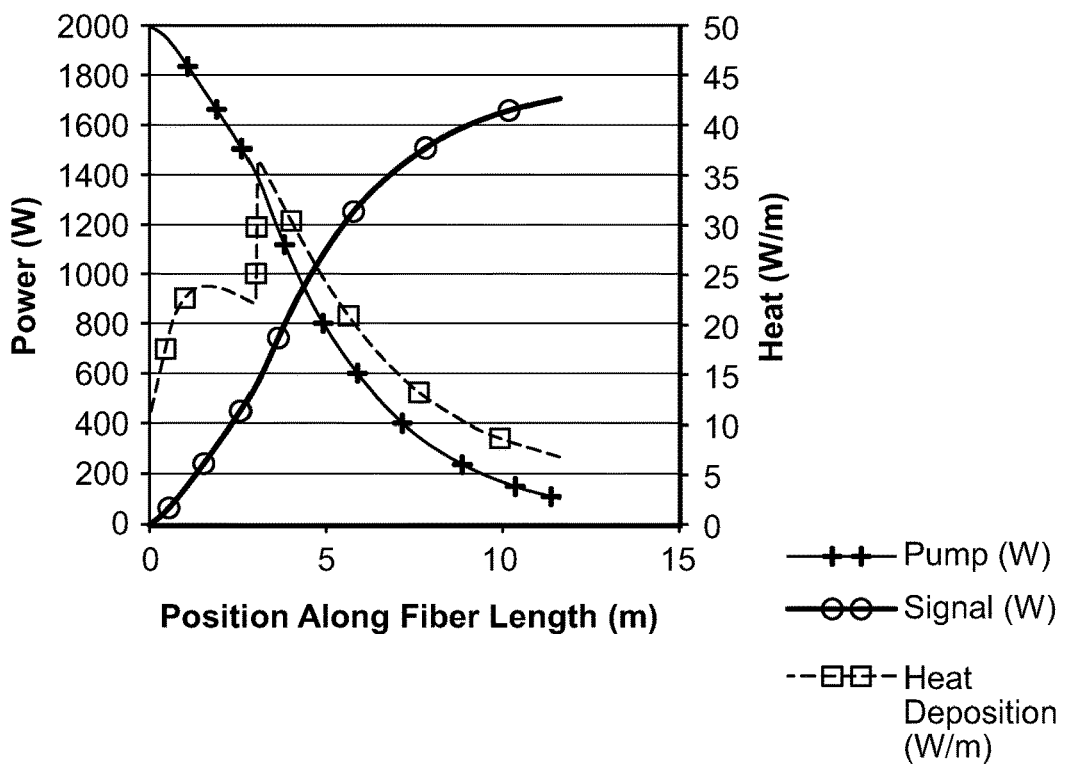
FIG. 12 is a plot of the pump light power, the signal light power, and the heat deposited in a for a fiber having a change in cross-sectional geometry of the first cladding region from circular to octagonal at position where 30% of the pump power has been absorbed, which is 3.0 meters.

FIG. 12 is a plot of the pump light power, the signal light power, and the heat deposited in the fiber from the core, along fiber length, for a fiber having a change in cross-sectional shape of the first cladding region at the fiber position where about 30% of the pump power has been absorbed. This plot refers to conditions in which the input pump light is launched into the first cladding region with a pump power of 2000 W at a wavelength of 976 nm and an input signal power of 10 W at a wavelength of 1064 nm. The fiber has a core that is ytterbium-doped, at about the same concentration across the entire length of the fiber with a 25 µm-diameter core, and a 400 µm-diameter first cladding region.

The first cladding region of this fiber has a circular cross-sectional geometry for fiber positions from 0.0 m to 3.0 m, with a first cladding absorption coefficient of about 0.23 dB/meter at 915 nm, and the first cladding region has an octagonal cross section for fiber sites from 3.0 m along the fiber onward (with a first cladding absorption coefficient of about 0.46 dB/meter at 915 nm). The plot shows that the peak heating in the fiber reaches about 36 W/m at 2 m along the fiber length. This is a small but measurable improvement over a fiber having a first cladding region that is octagonal for the entire fiber, and shows that positioning of the site for change in first cladding region cross-sectional geometry at the fiber position where about 30% of the input pump power has been absorbed can be useful.

This analysis and the data plots described above are not meant to be limiting and are provided as exemplary embodiments that demonstrate a doped fiber having a first cladding region that is of a relatively low-absorption, circular, cross section for a low-absorption extent of the fiber and that is of a relatively high-absorption, octagonal, cross section for a high-absorption extent of the fiber. FIG. 8 demonstrated in particular that there exists an inflection point, at 20% of effective doped fiber length, for which a distinction in effectiveness of shape change is found. For other non-circular, high-absorption cross-sectional shapes, such as a circle with a flat or other nonsymmetrical feature, such an inflection point in data can be determined, and should be expected to be different than that data shown for the circular-to-octagonal shape change of this particular embodiment.

Figure 13A:
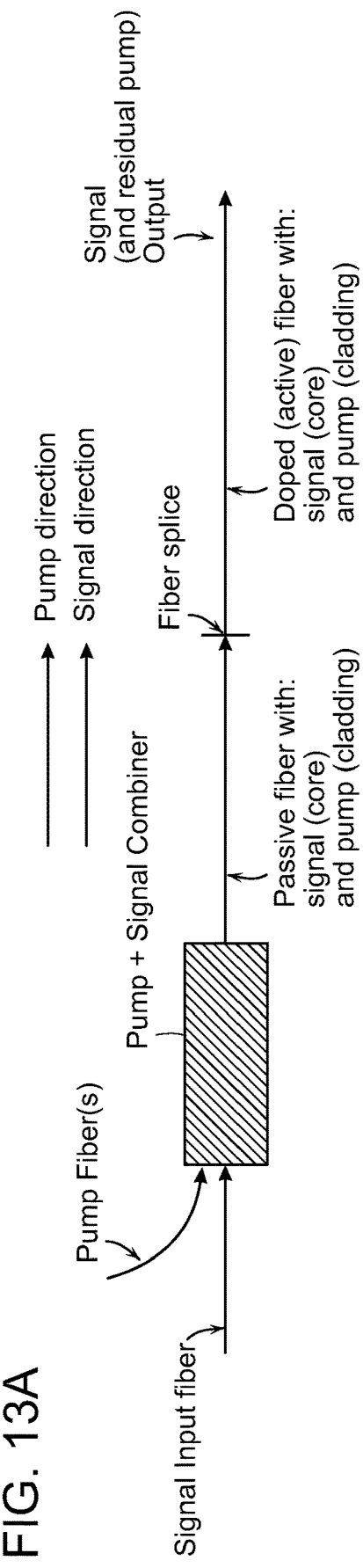
FIGS. 13A-13E are schematic views of fiber amplifier configurations that include both undoped and doped fiber lengths.
Figure 13B:
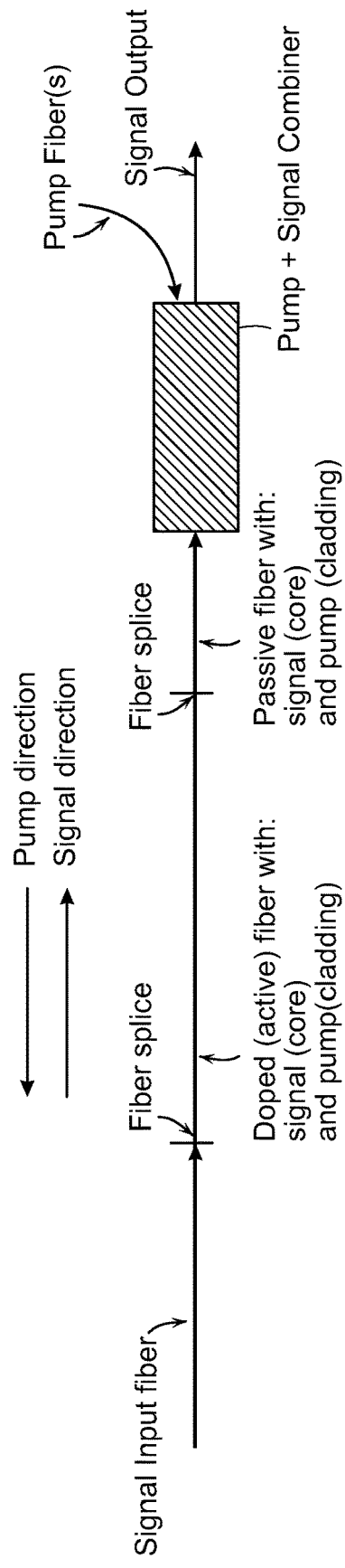
Figure 13C:
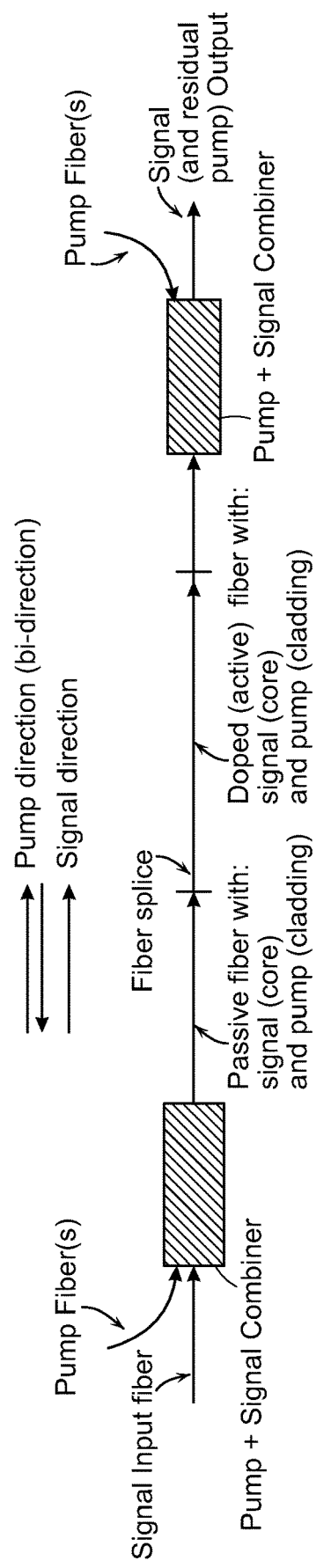
Figure 13D:
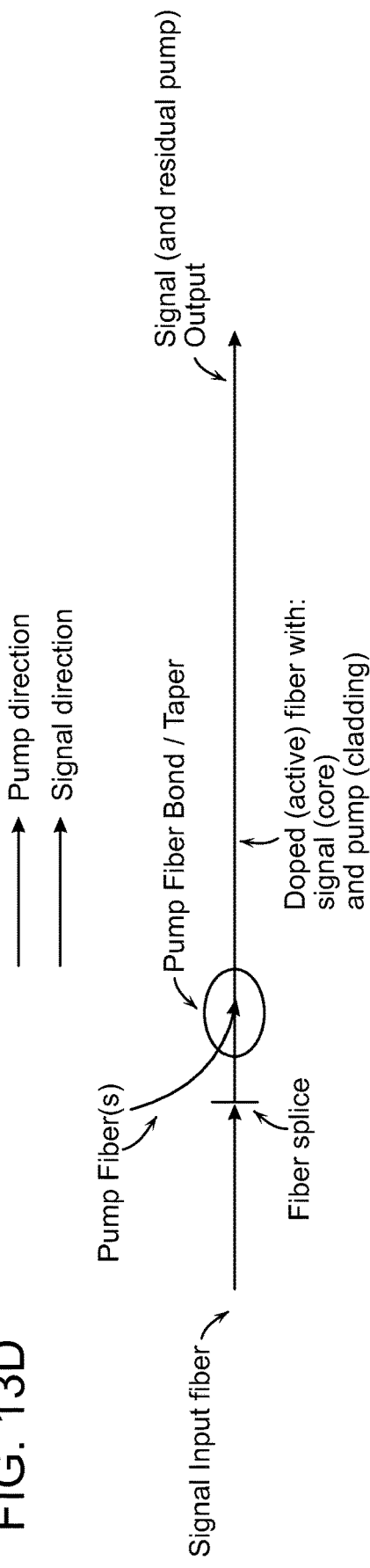
Figure 13E:
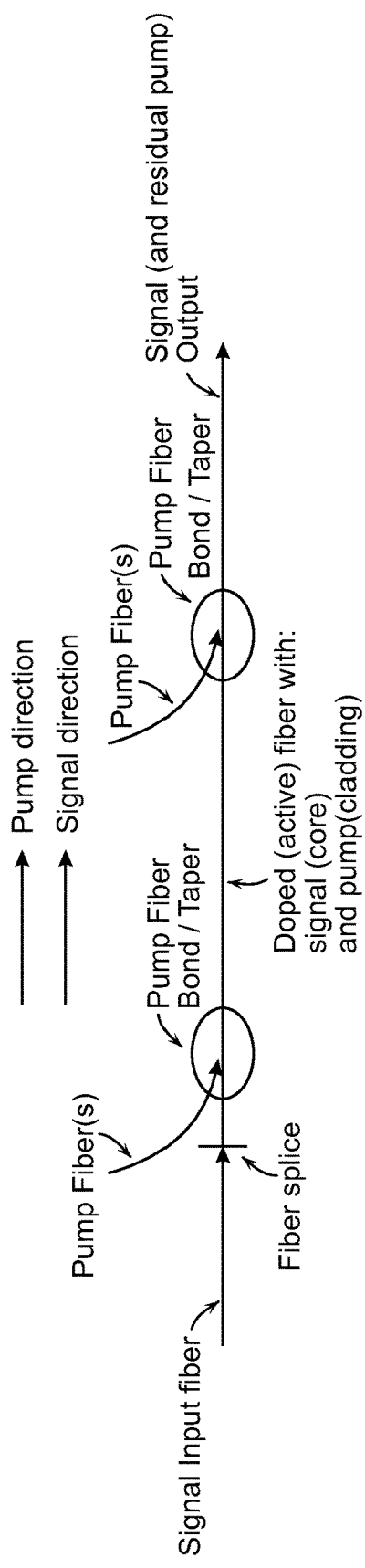

This analysis is specific to the section or sections of a fiber system that are doped. It is recognized that many composite fiber systems can be employed in which fiber splicing and other arrangements enable many different combinations that included undoped as well as doped fiber. FIG. 13A is a schematic diagram of an end-pumped co-propagating fiber amplifier configuration including a combiner for combining signal light and pump light that are together input to a passive, undoped fiber length that is spliced to an active, doped fiber length. An undoped core is therefore included here in the cladding, and a high-absorption geometry can be employed for the first cladding region along the undoped fiber length. FIG. 13B is a schematic diagram of an end-pumped counter-propagating fiber amplifier configuration including a combiner for combining counter-propagating signal light and pump light. A doped active fiber length is arranged between a first passive fiber length and a second passive fiber length. FIG. 13C is a schematic diagram of an end-pumped co- and counter-propagating fiber amplifier configuration including combiners at ends of the fiber arrangements. The active, doped fiber section here is arranged between several sections of passive fiber. FIG. 13D is a schematic diagram of a co-propagating fiber amplifier configuration in which a pump fiber provides the pump light into a doped fiber section and a passive fiber section provides the input signal light, with the passive fiber section being spliced into the doped active fiber section. FIG. 13E is a schematic diagram of a co-propagating fiber amplifier configuration including several pump light input sites along an active, doped fiber section. The signal light is input through a passive fiber length to one end of the doped fiber length. The pump fibers are integrated with the doped fiber section at selected sites.

All of the arrangements shown in FIGS. 13A-13E represent several embodiments in a wide range of embodiments that can be employed with an active doped fiber in the design and manufacture of fiber lasers and amplifiers. The cross-sectional geometry of the first cladding region is changed at one or more points along the doped fiber length or lengths of the system, and the location of changes in cross-sectional geometry are computed based on the doped fiber length and the effective doped fiber length, not the undoped fiber sections that may be included in the fiber system.

Figure 14B:
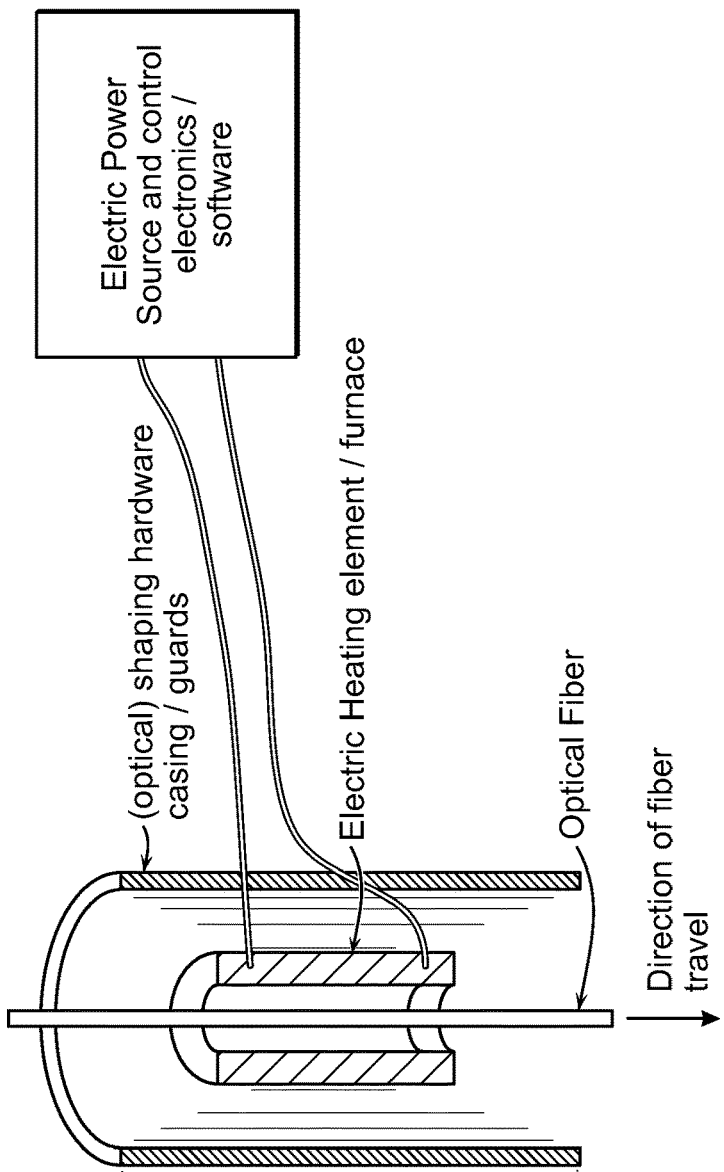
FIGS. 14A-14B are schematic views of a fiber draw tower that includes shaping hardware and control systems for shaping the geometry of the first cladding region of a fiber.
Figure 14A:
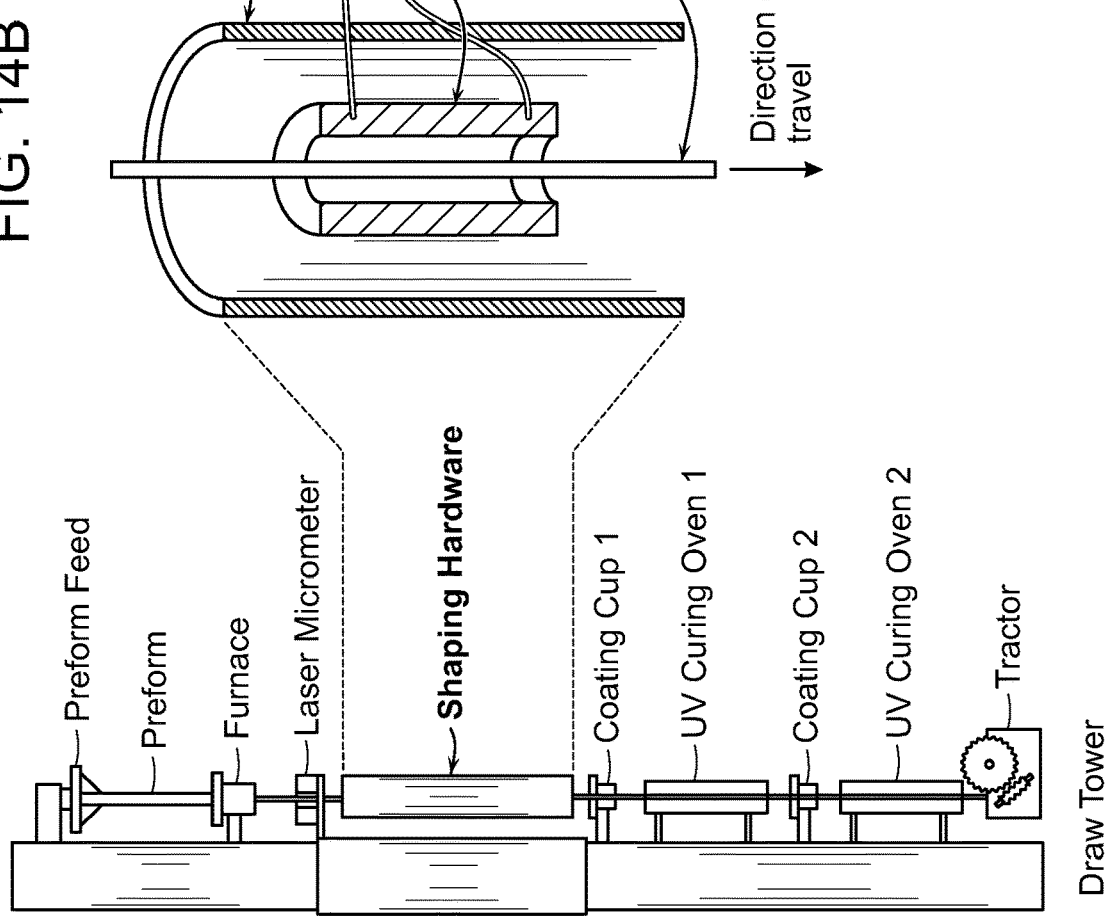

In production of the fiber provided herein, the two or more cross-sectional geometries that are selected for the first cladding region can be imposed on the first cladding region as the fiber is drawn, or can be achieved in a post-draw process. Referring to FIGS. 14A-14B, in a first embodiment, a fiber draw tower includes shaping hardware that is arranged to produce selected cross-sectional geometry at selected sites along the length of the first cladding region. As shown in FIGS. 14A-14B, such shaping hardware can be provided as, e.g., a heating element that in a selected manner causes the first cladding region to be shaped by thermal control. The fiber preform to be drawn into a fiber is configured based on this control so that the resulting fiber exhibits the desired cross-sectional profile. For example, an all-octagonal first cladding region can be provided in the fiber preform and the shaping hardware employed to provide a circular cross section at selected portions of the fiber.

In a process for the thermal shaping of the first cladding region of the fiber, a radiative or conductive heat source can be employed that surrounds the circumference of the fiber. If the surface of the outer second cladding is melted to pull, by surface tension, the first cladding region from an octagonal or similar geometry to a circular geometry before hardening of the outer cladding region, then a change in geometry of the first cladding region can be obtained. Here it can be preferred that the heat source application is of relatively short duration so that the doped fiber core does not deform or suffer significant thermal diffusion, which could affect the modal properties of the fiber. A radiative source can be controlled to operate at a selected wavelength that is strongly absorbed by the outer second cladding region at or near the surface of this region to assist in preferential melting of the surface layers of the fiber without deformation of the fiber core. It can be preferred to modulate the heat source intensity on the scale of about 1 m or less of the fiber length to obtain the desired cross-sectional geometry profile.

In a further embodiment, a radiative or conductive heat source is controlled to unevenly heat the fiber around the circumference of the fiber, e.g., being biased to preferentially heat a subsection of the circumference of the fiber. In this embodiment, a fiber preform in which the first cladding region has circular symmetry can be processed to break the symmetry by generating a flat or otherwise deformed site around the circumference of the first cladding region. Pulsing of a laser that is focused on one site around the fiber circumference can here be employed to effectively generate a defect or other localized change in geometry. This thermal shaping process can be assisted with the use of fiber tension, axial twist, directed gas flow, directed pressure application, or other assisting technique. The heat source and assistance technique is modulated on the scale of about 1 m or less for the desired tailoring of the cross-sectional profile.

The draw tower shaping hardware for enabling the shaping of the first cladding region can include shaping sensors, such as temperature sensors, laser micrometers, and other sensors. Closed-loop feedback control can therefore be implemented to control the shaping of the first cladding region cross-sectional geometry. But open-loop shaping of the first cladding region can be conducted where shaping control is well-characterized.

In a further embodiment for shaping the cross-sectional geometry of the first cladding region, the fiber preform is shaped specifically to cooperate with selected a draw process control for effecting changes in the first cladding region cross-sectional geometry. For example, the preform can be provided with a photonic/air-like fiber structure in the preform section of the first cladding region, with the preform structure being selected to break the symmetry of the first cladding region during the fiber draw such that a high-pump absorption effect is achieved. This structure can be provided along the length of the preform by, e.g., drilling or using, e.g., capillary-like glass tubes. During draw of the preform on the fiber draw tower, the voids are selectively either maintained or collapsed by the thermal shaping process hardware to form circular symmetry at selected portions of the fiber. The voids can be preferentially sited near the surface of the fiber so that the heat source can effectively cause collapse without disturbing the core of the fiber. The heat source and assistance technique is modulated on the scale of about 1 m or less for the desired tailoring of the cross-sectional profile.

If desired, the first cladding region can be shaped prior to formation of the second outer cladding region around the first cladding region. In preferred embodiments, sites around the circumference of the first cladding region are shaved, abraded, thermally softened and then shaped, mechanically shaped and then annealed, or otherwise processed to produce selected cross-sectional geometry of the first cladding region prior to formation of the second cladding region.

The thermal shaping techniques described above can be employed after thermal drawing rather than during the fiber draw itself. Thus, the fiber draw tower can include shaping apparatus, or alternatively, post-draw apparatus can be employed for shaping fiber after the draw. The outer second cladding region can be removed from portions of the fiber to expose the first cladding region for shaping those portions of the first cladding region, or processes that adjust the first cladding region with the second cladding region in place can be employed after the fiber is drawn. Here a long length of fiber can be processed and then cut into lengths so that each length has the desired change in cross-sectional shape at a selected site or sites relative to the ends of each cut fiber length.

Whatever shaping mechanism is employed, whether during fiber draw or after fiber draw, it is preferable that the dimensions and cross-sectional geometry of the fiber core not be changed or be changed only very minimally over the entire length of the fiber. In one embodiment, the dimensions and cross-sectional geometry of the second, outer cladding region, radially outside of the first cladding region, are also not changed over the entire length of the fiber. In one preferred embodiment, the cross section of the first cladding region is changed between at least two different geometries while the cross-sectional geometry of the fiber core and the second cladding region remain constant along the entire fiber length.

The fiber provided herein can be manufactured of any suitable materials. For example, the fiber core and first cladding region can be provided as suitable materials such as silica-based glasses, with dopants incorporated and selected to change the refractive indexes, such as Al and fluoride, and also dopants to act as the active laser medium, e.g., Yb. The second, outer cladding region can be any suitable material, e.g., glass, silicones, (fluoro)acrylates and any other organic compounds with desired optical and thermal properties. Other glass materials such as fluoride, ZBLAN, etc., can also be employed. With this description it is shown that the heating of an active doped fiber is reduced by limiting the degree of pump light absorption from the first cladding region into the fiber core through control of the first cladding region cross-sectional geometry. The first cladding region cross-sectional geometry is selectively changed, as either a gradual change or an abrupt change, along the length of the fiber, to provide a high-absorption length of the fiber and to provide a low-absorption length of the fiber. The reduction in heat that this design enables provides for superior operation of pulsed fiber lasers and amplifiers in which the fiber length is preferably as short as possible. Applications in materials processing, medicine, e.g., laser surgery, LIDAR, communications, and other fields are enabled by the design. In addition, single mode lasers and amplifiers, pulsed Quasi-CW, and CW, all in which it is preferable to minimize fiber length, are also well-addressed. Material processing applications are also well addressed, for example, for high power, Yb-doped industrial lasers and amplifiers, often exceeding 1 kW in average power, and for high power lasers and amplifiers doped with other dopants, such as erbium. In all of these applications, the reduction in heat dissipation achieved by the fiber design provided herein enables fiber operation that far surpasses that of conventional fiber configurations.

It is recognized that those skilled in the art may make various modifications and additions to the embodiments described above without departing from the spirit and scope of the present contribution to the art. Accordingly, it is to be understood that the protection sought to be afforded hereby should be deemed to extend to the subject matter claims and all equivalents thereof fairly within the scope of the invention.

I claim:

1. A draw tower for producing a length of optical fiber including a fiber core, an inner cladding layer, and an outer cladding layer, the draw tower comprising:
    an optical fiber preform feed for feeding an optical fiber preform into the draw tower;
    a thermal furnace disposed downstream of the optical fiber preform feed for heating the optical fiber preform to draw the optical fiber preform into said length of optical fiber including a fiber core, an inner cladding layer, and an outer cladding layer;
    fiber shaping hardware disposed downstream of the thermal furnace;
    fiber shaping control electronics connected to the fiber shaping hardware to control the fiber shaping hardware to produce along said length of optical fiber at least one low-absorption fiber section having a first cross-sectional geometry of the inner cladding layer corresponding to a first level of absorption of input pump light from the inner cladding layer to the fiber core, and to produce along said length of optical fiber at least one high-absorption fiber section having a second cross-sectional geometry of the inner cladding layer corresponding to a second level of absorption of input pump light from the inner cladding layer to the fiber core, said second level of absorption of input pump light being greater than said first level of absorption of input pump light; and
    a tractor disposed downstream of the shaping hardware for pulling said optical fiber preform into and through the thermal furnace and the fiber shaping hardware.

2. The draw tower of claim 1 wherein the fiber shaping control electronics is connected to the fiber shaping hardware to control the fiber shaping hardware to preserve as unchanged by the shaping hardware both cross-sectional geometry and cross-sectional dimensions of said fiber core.

3. The draw tower of claim 1 wherein the fiber shaping control electronics is connected to the fiber shaping hardware to control the fiber shaping hardware to preserve as unchanged by the shaping hardware both cross-sectional geometry and cross-sectional dimensions of said fiber outer cladding layer.

4. The draw tower of claim 1 wherein the fiber shaping control electronics is connected to the fiber shaping hardware to control the fiber shaping hardware to produce along said length of optical fiber a transition fiber section over which said first cross-sectional geometry of the inner cladding layer transitions to said second cross-sectional geometry of the inner cladding layer.

5. The draw tower of claim 1 wherein said fiber shaping hardware comprises mechanical hardware selected from mechanical shaving hardware and mechanical abrading hardware.

6. The draw tower of claim 1 wherein said fiber shaping hardware comprises shaping assist hardware for applying to said length of said optical fiber at least one of fiber tension, fiber axial twist, directed gas flow, and directed pressure application.

7. The draw tower of claim 1 wherein said fiber shaping hardware comprises a laser.

8. The draw tower of claim 1 wherein said shaping hardware comprises a heat source selected from a radiative heat source and a conductive heat source.

9. The draw tower of claim 1 wherein said shaping control electronics comprises at least one shaping sensor arranged to sense at least one of optical fiber temperature and optical fiber cross-sectional dimension.

10. The draw tower of claim 9 wherein said shaping control electronics comprises closed-loop feedback control electronics connected to said at least one shaping sensor.

11. A method of thermally drawing a fiber preform into a length of optical fiber including a fiber core, an inner cladding layer, and an outer cladding layer, comprising:
    arranging said fiber preform including a fiber preform core material; a fiber preform inner cladding layer material, and a fiber preform outer cladding layer material;
    feeding said fiber preform through a thermal furnace of an optical fiber draw tower to draw the fiber preform into said length of optical fiber having a fiber core, an inner cladding layer, and an outer cladding layer; and
    feeding said length of thermally drawn optical fiber through fiber shaping hardware disposed downstream of said thermal furnace of said optical fiber draw tower;
    controlling said fiber shaping hardware with fiber shaping control electronics to produce along said length of optical fiber at least one low-absorption fiber section having a first cross-sectional geometry of the inner cladding layer corresponding to a first level of absorption of input pump light from the inner cladding layer to the fiber core, and to produce along said length of optical fiber at least one high-absorption fiber section having a second cross-sectional geometry of the inner cladding layer corresponding to a second level of absorption of input pump light from the inner cladding layer to the fiber core that is greater than said first level of absorption of input pump light; and pulling said fiber preform into and through the thermal furnace and the fiber shaping hardware by a fiber draw tower tractor disposed downstream of the shaping hardware.

12. The method of claim 11 wherein controlling said fiber shaping hardware with said fiber shaping control electronics comprises controlling said fiber shaping hardware to preserve as unchanged both cross-sectional geometry and cross-sectional dimensions of said fiber core.

13. The method of claim 11 wherein controlling said fiber shaping hardware with said fiber shaping control electronics comprises controlling said fiber shaping hardware to preserve as unchanged both cross-sectional geometry of said fiber outer cladding layer.

14. The method of claim 11 wherein controlling said fiber shaping hardware with said fiber shaping control electronics comprises controlling said fiber shaping hardware to produce along said length of optical fiber a transition fiber section over which said first cross-sectional geometry of the inner cladding layer transitions to said second cross-sectional geometry of the inner cladding layer.

15. The method of claim 11 wherein controlling said fiber shaping hardware with said fiber shaping control electronics comprises controlling application of pulsed laser heat to said fiber length.

16. The method of claim 11 wherein controlling said fiber shaping hardware with said fiber shaping control electronics comprises controlling application of one of mechanical shaving and mechanical abrading to said fiber length.

17. The method of claim 11 wherein controlling said fiber shaping hardware with said fiber shaping control electronics comprises controlling application of at least one of tension, axial twist, directed gas flow, and directed pressure to said fiber length.

18. The method of claim 11 wherein controlling said fiber shaping hardware with said fiber shaping control electronics comprises controlling application of heat to said fiber by said fiber shaping hardware.

19. The method of claim 11 wherein controlling said fiber shaping hardware with said fiber shaping control electronics comprises sensing at least one of optical fiber temperature and optical fiber cross-sectional dimension.

20. The method of claim 19 wherein controlling said fiber shaping hardware comprises feedback control of said fiber shaping hardware based on said sensing of at least one of optical fiber temperature and optical fiber cross-sectional dimension.

* * * * *